United States Patent [19]

Gade et al.

[11] Patent Number: 4,761,832
[45] Date of Patent: Aug. 2, 1988

[54] FIBER OPTIC SWITCHING NETWORK

[75] Inventors: Raja R. Gade, Bloomingdale, N.J.; Frank H. Levinson, Redwood City, Calif.

[73] Assignee: AMP Incorporated, Harrisburg, Pa.

[21] Appl. No.: 750,568

[22] Filed: Jun. 28, 1985

[51] Int. Cl.$^4$ .............................................. H04B 9/00
[52] U.S. Cl. ................................... 455/612; 455/601; 455/610
[58] Field of Search ................ 455/600, 601, 610, 612

[56] References Cited

U.S. PATENT DOCUMENTS

| | | | |
|---|---|---|---|
| 3,208,342 | 9/1962 | Nethercot, Jr. | |
| 3,918,794 | 11/1975 | Milton | 350/96 |
| 4,011,543 | 3/1977 | Soref et al. | 455/612 |
| 4,013,000 | 3/1977 | Kogelnik | 350/96 C |
| 4,153,329 | 5/1979 | Gillette | 350/96.13 |
| 4,302,071 | 11/1981 | Winzer | 350/96.2 |
| 4,315,666 | 2/1982 | Hicks, Jr. | 350/96.15 |
| 4,342,499 | 8/1982 | Hicks, Jr. | 350/96.15 |
| 4,360,247 | 6/1983 | Beasley | 350/96.15 |
| 4,387,954 | 11/1982 | Beasley | 350/96.15 |
| 4,453,802 | 6/1984 | Bridges et al. | 350/96.15 |
| 4,471,474 | 9/1984 | Fields | 350/96.15 |
| 4,477,725 | 10/1984 | Asawa et al. | 350/96.15 |
| 4,482,203 | 11/1984 | Stowe et al. | 350/96.15 |
| 4,493,528 | 1/1985 | Shaw et al. | 350/96.15 |
| 4,552,026 | 11/1985 | Knudsen et al. | 350/96.15 |
| 4,556,279 | 12/1985 | Shaw et al. | 350/96.15 |
| 4,564,262 | 1/1986 | Shaw | 350/96.15 |
| 4,593,968 | 6/1986 | Giallorenzi | 350/96.15 |

FOREIGN PATENT DOCUMENTS

| | | | |
|---|---|---|---|
| 0069054 | 5/1982 | European Pat. Off. | |
| 55-53931 | 4/1980 | Japan | 455/612 |
| 55-120238 | 9/1980 | Japan | 455/612 |
| 56-19002 | 2/1981 | Japan | |
| 56-42445 | 4/1981 | Japan | 455/612 |
| 57-20043 | 2/1982 | Japan | 455/612 |
| 58-59638 | 4/1983 | Japan | 455/612 |
| 59-39131 | 3/1984 | Japan | 455/612 |

OTHER PUBLICATIONS

Iwasa—Bidirectional 100 Mbit/sec Optical Repeater—Conf. IOOC81, Third Intern. Conf. on Int. Optics and Optical Fiber Comm., San Francisco, Calif., 27–29, Apr. 1981—pp. 38, 39.
Rawson—A Fiber Optical Relay—Optical Engineering—Jul./Aug. 1980, vol. 19, #4, pp. 628, 629.
Aoki et al.—"Paired Optical-Fiber Switch"—Opt. Soc. of Amer.—Optics Letters—vol. 4, No. 11, Nov. 1979, pp. 346, 347.
N. J. Moll & D. Dolfi, "Thermooptic Coupler: A Controllable Multimode Optical Directional Coupler," *Applied Optics*, vol. 22, No. 19, Oct. 1, 1983.
Alferness, R. C.; and Cross, Peter S., "Filter Characteristics of Codirectionally Coupled Waveguides with Weighted Coupling," *IEEE Journal of Quantum Electronics*, vol. QE-14, No. 11, Nov. 1978, pp. 843–847.
Miller, Stewart E., "Some Theory and Applications of Periodically Coupled Waves", *The Bell System Technical Journal*, Sep. 1969, pp. 2189–2219.
Digonnet, Michael and Shaw, H. J., "Wavelength Multiplexing in Single-Mode Fiber Couplers", *Applied Optics*, vol. 22, No. 3, Feb. 1, 1983, pp. 484–491.
Digonnet, Michael J. F.; and Shaw, Herbert J., "Analysis of a Tunable Single Mode Optical Fiber Coupler," *IEEE Journal of Quantum Electronics*, vol. QE-18, No. 4, Apr. 1982, pp. 746–754.
Kogelnik, H., "Filter Response of Nonuniform Almost-Periodic Structures," *The Bell System Technical Journal*, vol. 55, No. 1, Jan. 1976, pp. 109–126.

(List continued on next page.)

Primary Examiner—Michael A. Masinick
Assistant Examiner—L. Van Beek

[57] ABSTRACT

An optical network is implemented by coupling of node switches to a single waveguide. The single waveguide can be connected, tail in mouth, to provide a low loss ring concentrator to which receiving and transmitting nodes are coupled via associated node switches. A processor also may be coupled by a node switch. Alternatively, the single waveguide may terminate at the processor.

11 Claims, 11 Drawing Sheets

OTHER PUBLICATIONS

Parriaux, O.; Bernoux, F. and Chartier, G., "Wavelength Selective Distributed Coupling Between Single Mode Optical Fibers for Multiplexing", *Journal of Optical Communications*, vol. 2, No. 3, 1981, pp. 105–109.

Alferness, R. C. and Schmidt, R. V., "Tunable Optical Waveguide Directional Coupler Filter", *Applied Physics Letters*, vol. 33, No. 2, Jul. 15, 1978, pp. 161–163.

Williams, J. C., "Wavelength Division Multiplexing (WDM) Couplers," *Fiber Optics—Technology,* '82, SPIE, vol. 326, 1982, pp. 76–82.

Lovell, D. J., "Patents Patter: 1," *Applied Optics*, vol. 22, No. 24, Dec. 15, 1983, pp. 3913–3916.

Findakly, Talal; and Chen, Chin-Lin, "Optical Directional Couplers with Variable Spacing," *Applied Optics*, vol. 17, No. 5, Mar. 1, 1978, pp. 769–773.

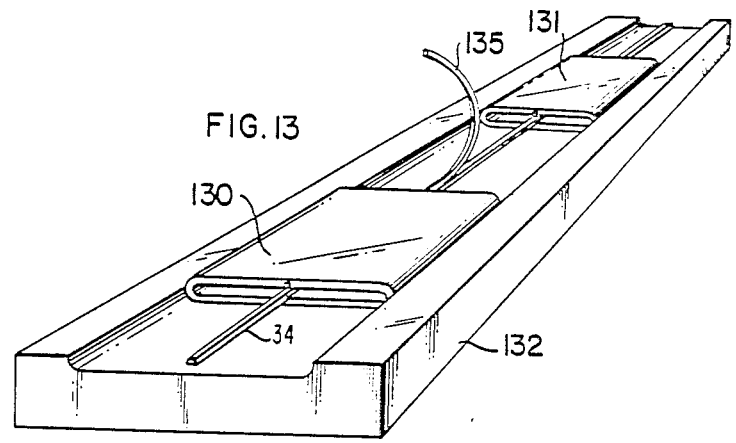
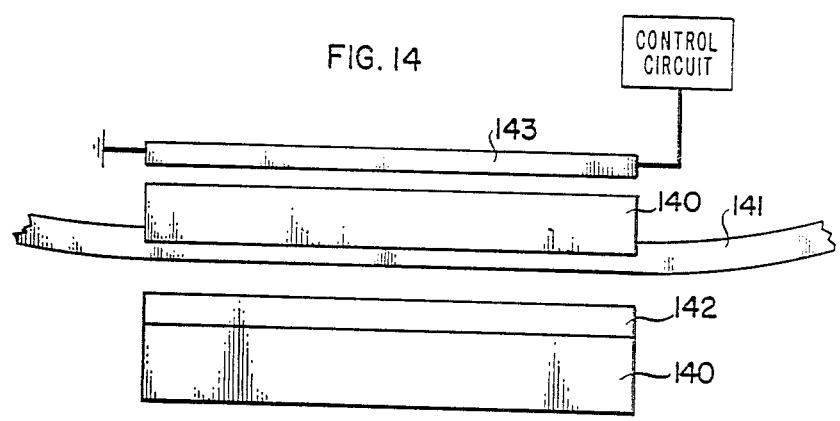
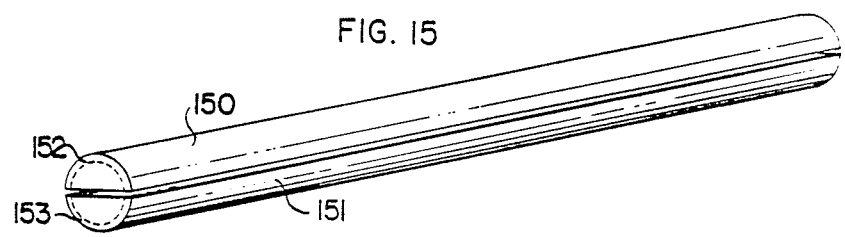

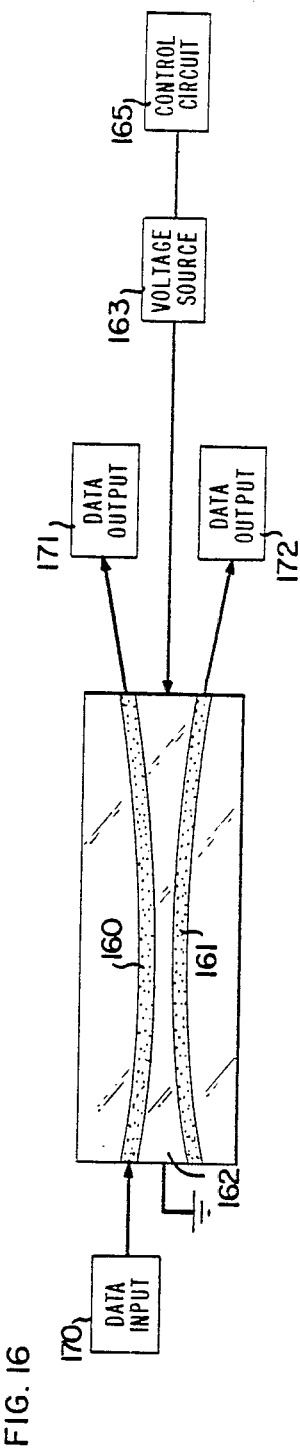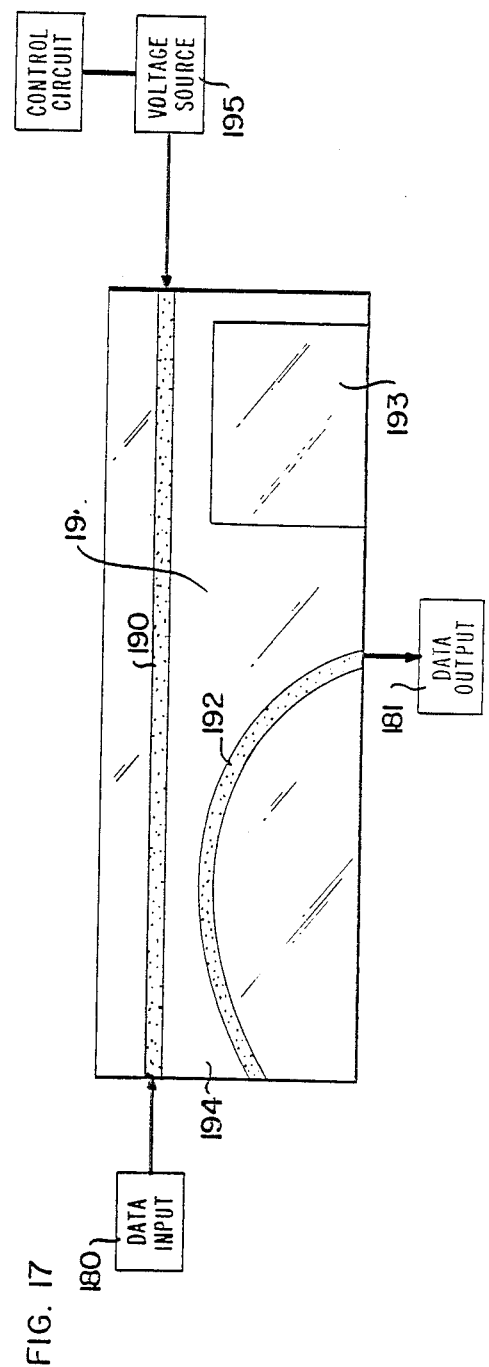

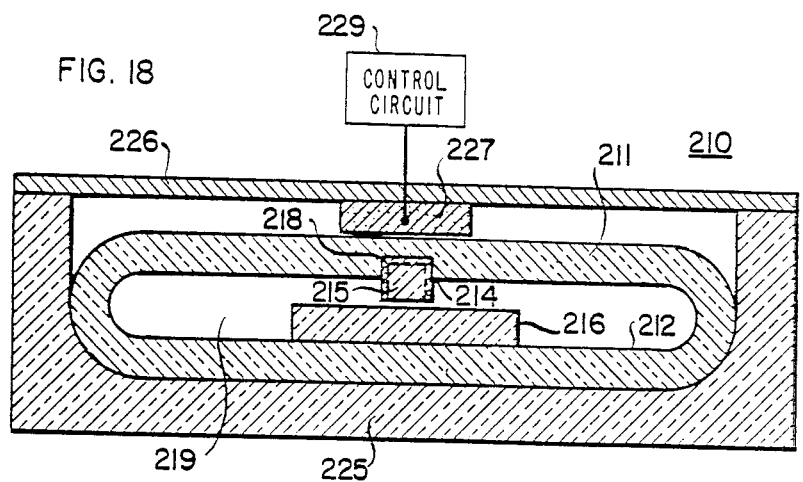
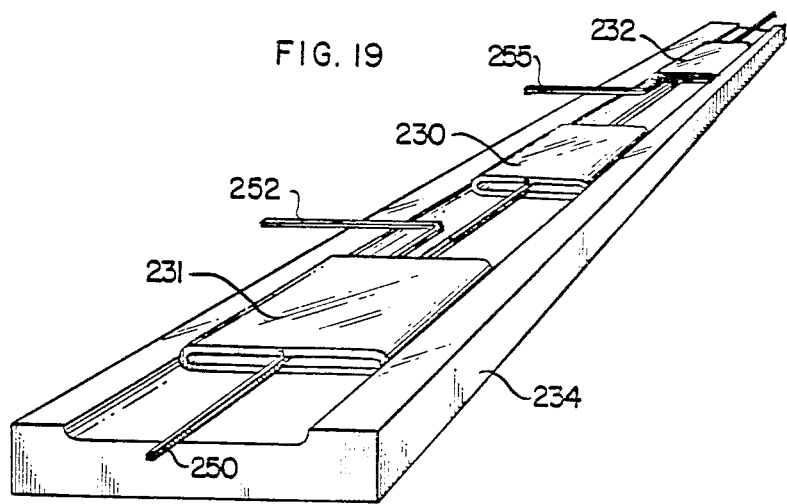

FIBER OPTIC SWITCHING NETWORK

FIELD OF THE INVENTION

This invention relates to a fiber optic network and more particularly to such a network including novel fiber optic functional elements which permit a unique network organization and control.

BACKGROUND OF THE INVENTION

Fiber optic local area networks are known to be desirable and such networks have been discussed generally in publications. But no implementations have been disclosed for such networks. One possible reason for such non-disclosure is that no practical implementation is known whereby a commercially acceptable number of nodes (terminals) can be interconnected. The prime reason for this failure is that presently available optical switches are plagued with high losses and exacting tolerances which dictate high cost.

Copending patent applications Ser. No. 750,805 filed June 28, 1985 entitled "Optical Arrangement" and Ser. No. 750,811 filed June 28, 1986 entitled "Optical Eraser and Node Switch for an Optical Network" and assigned to the assignee of the present application disclose fiber optic sleeve switches and erasers which permit fiber optic networks to be implemented with relatively inexpensive and loss-free components. The disclosure in each of these copending patent applications is hereby incorporated herein by reference.

BRIEF DESCRIPTION OF THE INVENTION

The present invention utilizes the components of the above-noted patent applications in a fiber optic network which embodies the requirements of projected fiber optic networks discussed in the literature. The network employs a Ring Wiring Center (RWC) which includes a single optical fiber attached to a processor. All terminals (nodes) are coupled to that single optical fiber by its associated node switch. Importantly, all node switches share a common optical fiber and thus interface losses are avoided.

The control for each node switch is supplied by associated Digital Control Logic (DCL). A Central Watchdog Timer (CWDT) circuit orchestrates the DCL's and thus the overall network operation. Manual controls or automated monitoring of the system permits a terminal (node) to be connected to or disconnected from that single fiber in a manner to implement a token-passing ring network. The term "token" characterizes an enabling code which permits a node to transmit into the network.

BRIEF DESCRIPTION OF THE DRAWING

FIG. 13 is a perspective view of the portion of the arrangement shown in FIG. 12, also showing the placement of optical fibers;

FIG. 14 is a schematic side view of an information eraser that may be used with this invention;

FIG. 15 is a schematic perspective view of an alternative geometry for fibers for use with the switch of FIG. 8;

FIGS. 16 and 17 are schematic top views of integrated optic switching arrangements that may be used with this invention;

FIG. 18 is a cross-sectional view of an eraser that may be used with this invention;

FIG. 19 is a projection view of a node switch employing the eraser of FIG. 18;

DETAILED DESCRIPTION

Figure 1:
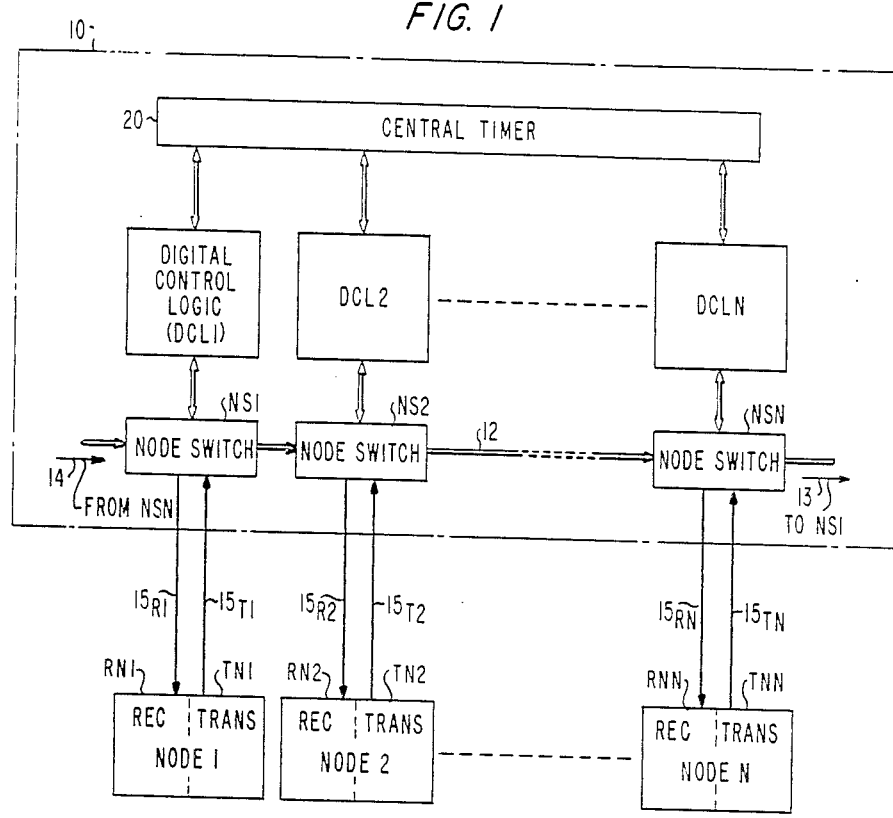
FIG. 1 is a block diagram of an optical fiber network organized in accordance with the principles of this invention.

FIG. 1 shows a ring wiring center (RWC) represented by broken block 10. The center includes a plurality of node switches NS1, NS2, - - -, NSN. Each node switch may be implemented as indicated below.

The node switches share a common fiber 12. Fiber 12 is a continuous single strand which links all the switches and returns to connect to itself, tail in mouth, as indicated by arrows 13 and 14. Each node switch operates to bypass a portion of fiber 12 by routing information through a node or terminal. The nodes are designated RN1, RN2, - - -, RNN and TN1, TN2, - - -, TNN and would, in practice, constitute local area network (LAN) terminals. Interconnections between a node NSi and the associated receiving and transmitting nodes RNi and TNi (where i is a dummy variable) are made by optical fibers $15_{R1}$, $15_{T1}$, $15_{R2}$, $15_{T2}$, - - -, $15_{RN}$, $15_{TN}$. Optical fibers $15_{Ri}$ and $15_{Ti}$ are coupled to optical fiber 12 at associated bypass portions therealong in each instance by a pair of glass sleeve switches included in each of the node switches. As is fully disclosed in the above noted patent applications, the two glass sleeve switches in each of the node switches are separated by an optical eraser, which is also known as an optical absorber or attenuator (see application Ser. No. 750,811, which illustrates the structure of such a device). The node switch operates to couple fibers $15_{Rj}$ and $15_{Tj}$ to fiber 12 via the respective tube switch and to absorb optical energy not tapped into fiber $15_{Rj}$ where j also is a dummy variable.

The operation of each node switch is controlled by an associated digital control logic arrangement, designated $DCL_1$, $DCL_2$, - - -, $DCL_N$ for node switches NS1, NS2, ---, NSN, respectively. Each DCL is operative to apply a sustained voltage level, typically 5 or 12 volts to those actuators in the associated node switch. The three actuators respond to move optical fibers $15_{R1}$ and $15_{TJ}$ into coupling relationship with optical fiber 12 and to move an optical absorber (not shown) into a coupling relationship with fiber 12 also. The result is that information in fiber 12 thereafter circulates through the associated terminal (RNi and TNi).

Figure 2:
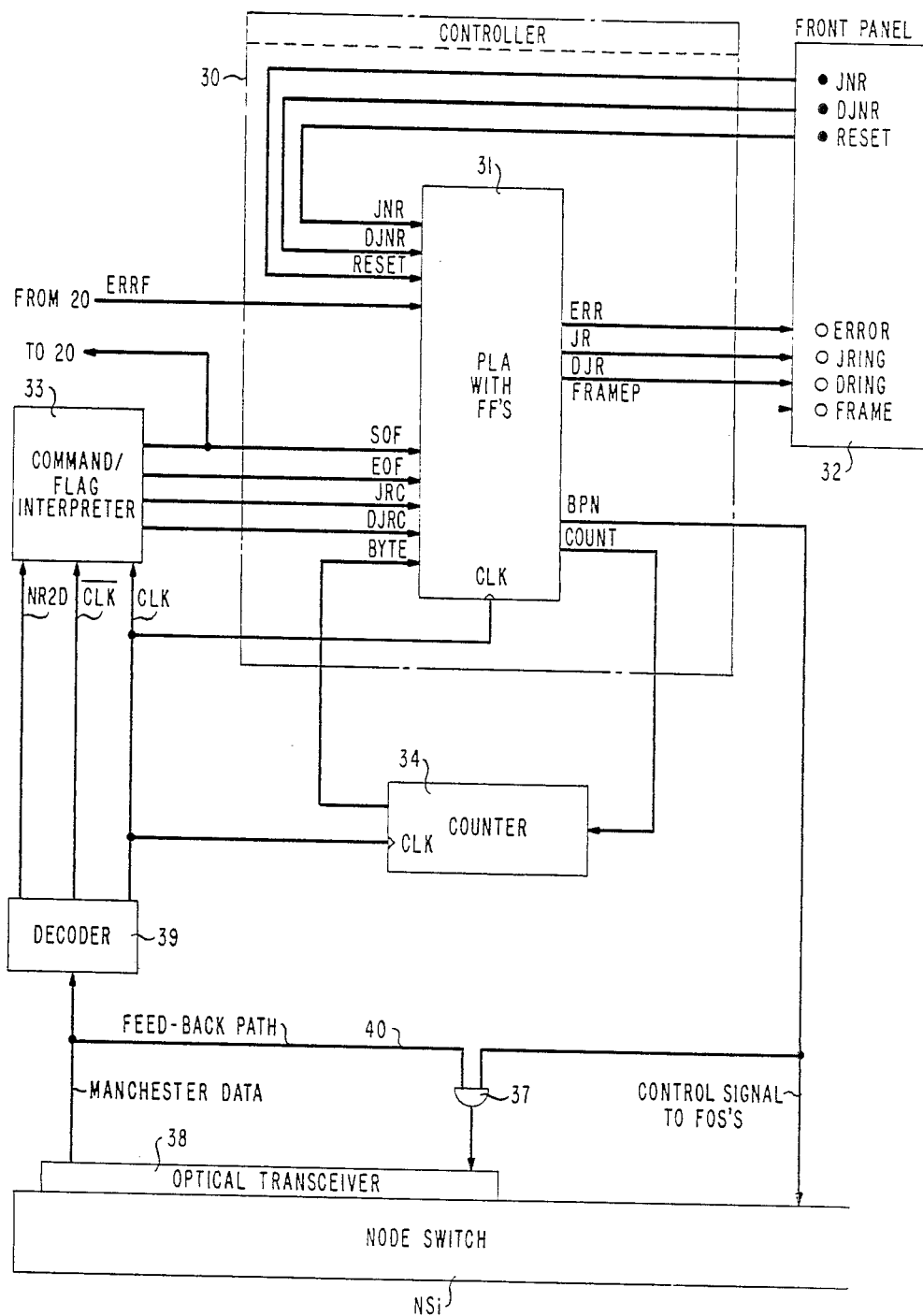
FIG. 2 is a block diagram of a digital control logic portion of the network of FIG. 1.

FIG. 2 shows a block diagram of a digital control logic arrangement (DCL) for a representative node switch NSi. The DCL includes a controller represented by a broken block 30. The controller comprises a programmable logic array (PLA) 31 including flip flops (not shown) operative to maintain constant output voltage levels. The PLA has nine inputs, six outputs and a clock input all designated by mnemonics representing the associated function. A PLA is a conventional decoder responsive to input signals to provide state conditions for the DCL and typically comprises a semiconductor AND-NOR arrangement conventional in the art. The inputs are designated from top to bottom, as viewed, JNR, DJNR, RESET, ERRF, SOF, EOF, JRC, DJRC, BYTE, and, at the bottom of PLA 31, Input CLK. The outputs from top to bottom on the right of PLA 31 are designated ERR, JR, DJR, FRAMEP, BPN and COUNT. Table I lists the inputs and outputs along with the associated descriptions:

TABLE I

| | Description |
|---|---|
| Input | |
| JRC | Join Ring Command |
| DJRC | Disjoin Ring Command |
| SOF | Start Of Frame Delimiter |
| EOF | End Of Frame Delimiter |
| BYTE | Byte Shift |
| ERRF | Error Flag From Timer 20 |
| Power-Up | Power is Switched On |
| JNR | Join Ring Push Button Is Pressed |
| DJNR | Disjoin Ring Push Button Is Pressed |
| RESET | DCL Rest Push Button Is Pressed |
| Output | |
| BPN | By-Pass The Node |
| COUNT | Start The Byte Counter |
| JR | Node Joined The Ring |
| DJR | Node Disjoined The Ring |
| ERR | Error Detected On The Node Side |

The inputs, Power-Up, JNR, DJNR, and RESET are asynchronous input/manual interrupts which originate on a front panel 32 of the enclosure for the ring wiring center as will be discussed more fully hereinafter. Switches on the front panel are connected to like designated inputs to PLA 31 as shown. The ERRF input is connected to central timer 20. Inputs JRC, DJRC, SOF and EOF are connected to outputs of a command/flag interrupter 33. Input BYTE is connected to the output of counter 34.

Outputs ERR, JR, DJR, and FRAMEP are connected to like designated indicators on front panel 32. The indicators typically are lamps (light emitting diodes) which provide a visual representation of the node condition. Output BPN is connected to the actuators of the sleeve switches and eraser included in node switch NSi. Output BPN also is connected to an input of AND circuit 37. Output COUNT is connected to the input of counter 34.

An optical transceiver 38 is coupled to optical fiber 12 of FIG. 1 to generate electrical signals representative of the optical information being carried by the fiber. An output of transceiver 38 is connected to an input of decoder 39 and to a second input to AND circuit 37. The output of AND circuit 37 is connected to an input to transceiver 38 to provide a feedback path 40 as indicated. Three outputs of decoder 39, designated NRZD, CLK and $\overline{\text{CLK}}$ are connected to inputs to interpreter 33, and to the CLK input of PLA 31 and the CLK input of counter 34 as shown. Optical transreceiver 38 comprises a standard opto-electronic receiver module. Similarly, decoder 39 comprises a standard decoding integrated circuit chip.

Figure 3:
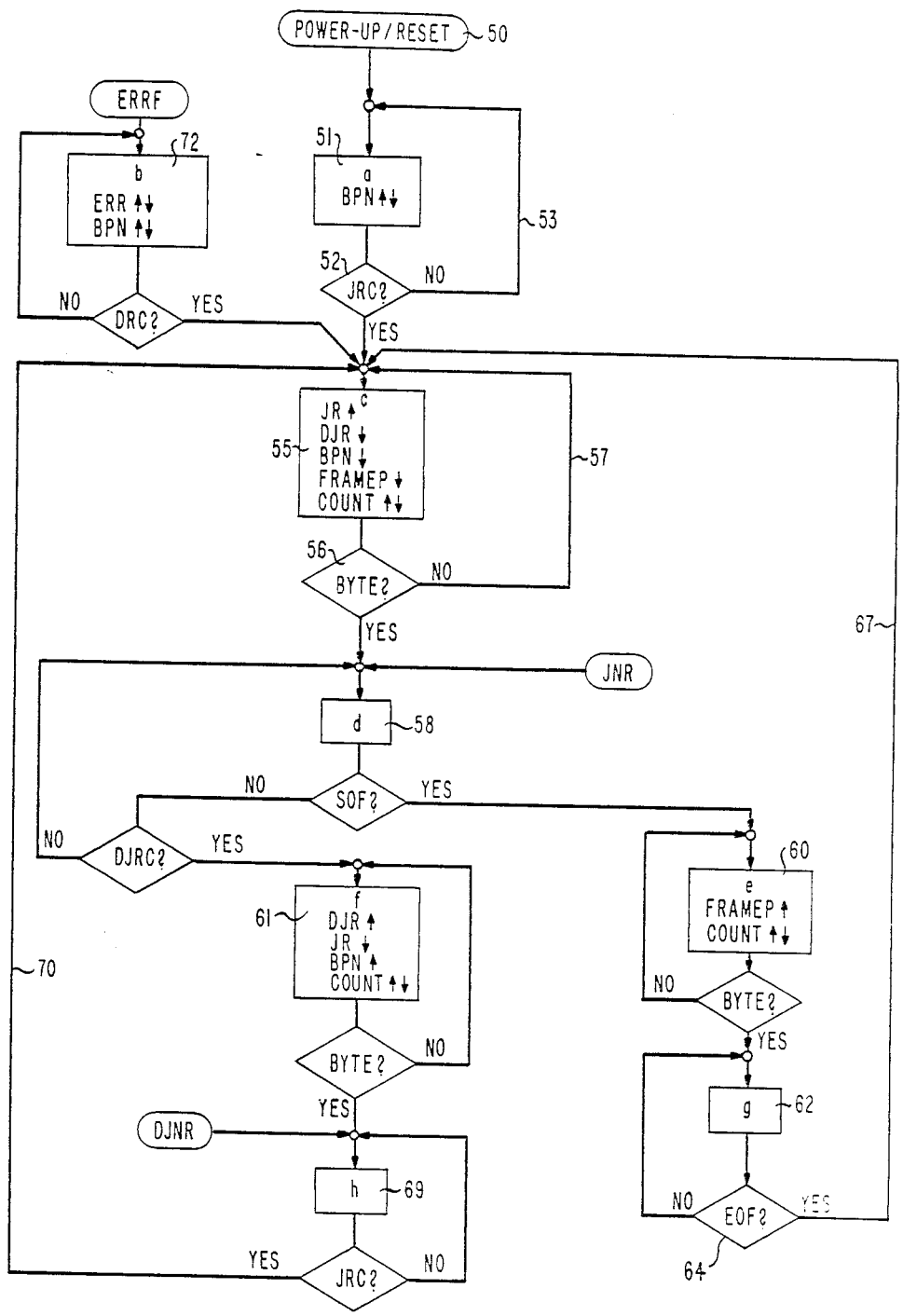
FIGS. 3 and 4 are a flow chart and mnemonic documented state diagrams of the operation of the digital control logic portion of FIG. 2.

The operation of the DCL is discussed in connection with FIGS. 3 and 4. Operation is initiated with the activation of the RESET switch on front panel 32 of FIG. 2. This operation is represented by oval 50 of FIG. 3. The next operation is for PLA 31 to activate output BPN to bypass the associated node as represented by block 51 designated BPN. Next follows a join ring command (JRC) represented by diamond-shaped box 52. If no JRC signal is given, operation returns to the beginning as indicated by arrow 53. Controller 30 continually checks for a JRC signal.

When a JNR command is given by activation of switch JNR on front panel 32 of FIG. 2, PLA 31 activates the outputs JR and COUNT, and deactivates BPN, FRAMEP, and DJR signals as indicated by the downward directed and upward directed arrows in block 55. The associated node is now joined in the ring (viz: coupled to fiber 12).

Counter 34 responds to the PLA COUNT output signal to count eight clock pulses to generate a BYTE signal upon which controller 30 leaves the state indicated by block 55, deactivating the COUNT signal. The BYTE signal is indicated by diamond-shaped block 56. If no BYTE signal occurs, the state of block 55 is re-initiated as indicated by arrow 57. If a BYTE signal occurs, the operation proceeds to box 58 and waits for a next signal.

One of two signals could appear next and the controller enters first or second states represented by box 60 or 61, depending on which signal is received. If an SOF (start of frame) signal occurs after the COUNT signal is deactivated, the controller moves to a state represented by box 60, activating FRAMEP and COUNT output signals. The controller then moves to a state represented by box 62 when a BYTE signal arrives from the counter and deactivates the COUNT signal. The FRAMEP signal remains active in both states (60 and 62) indicating at the front panel 32 that the node is passing a frame starting with the start of frame delimiter and ending with the end of frame delimiter. This frame may be just an empty TOKEN signal or a complete frame with a busy TOKEN and accompanying information. In this connection, the term "TOKEN" characterizes an enabling code in the data stream which permits a node to receive data. The controller thereafter waits for an EOF (end of frame) signal from interpreter 33 which is in a state represented by box 64. The controller moves to the state represented by box 55 when the EOF signal arrives as indicated by arrow 67.

Alternatively, a DJRC (disjoin ring command) signal may arrive when the controller is in the state represented by box 58. In response the controller enters the state represented by box 61 where the DJR output is activated to indicate that the node issued the disjoin ring command to disconnect itself from the network. In the state represented by box 61, the JR signal is deactivated and the node is bypassed from the ring network by activating the BPN signal. The controller waits for a JRC command (join ring command) as indicated by the diamond-shaped box. The COUNT and BYTE signals take care of shifting out the command bits upon which the controller returns to the state represented by box 55 as indicated by arrow 70.

The ERRF (ERROR flag) signal is an asynchronous pulse generated by timer 20 of FIG. 1 whenever an error is detected in the network. Detectable errors are, for example, lost TOKEN and broken fiber. The ERRF signal interrupts the controller and moves it to a state indicated by box 72 in FIG. 3 regardless of the controller's state when the signal occurs. In the state of box 72, the controller activates the BPN signal to bypass the node and the front panel shows an ERR indication. When the error is found and corrected, the node issues the JRC command to join the network again. That is to say, the JRC signal moves the controller into the state of box 55.

Figure 4:
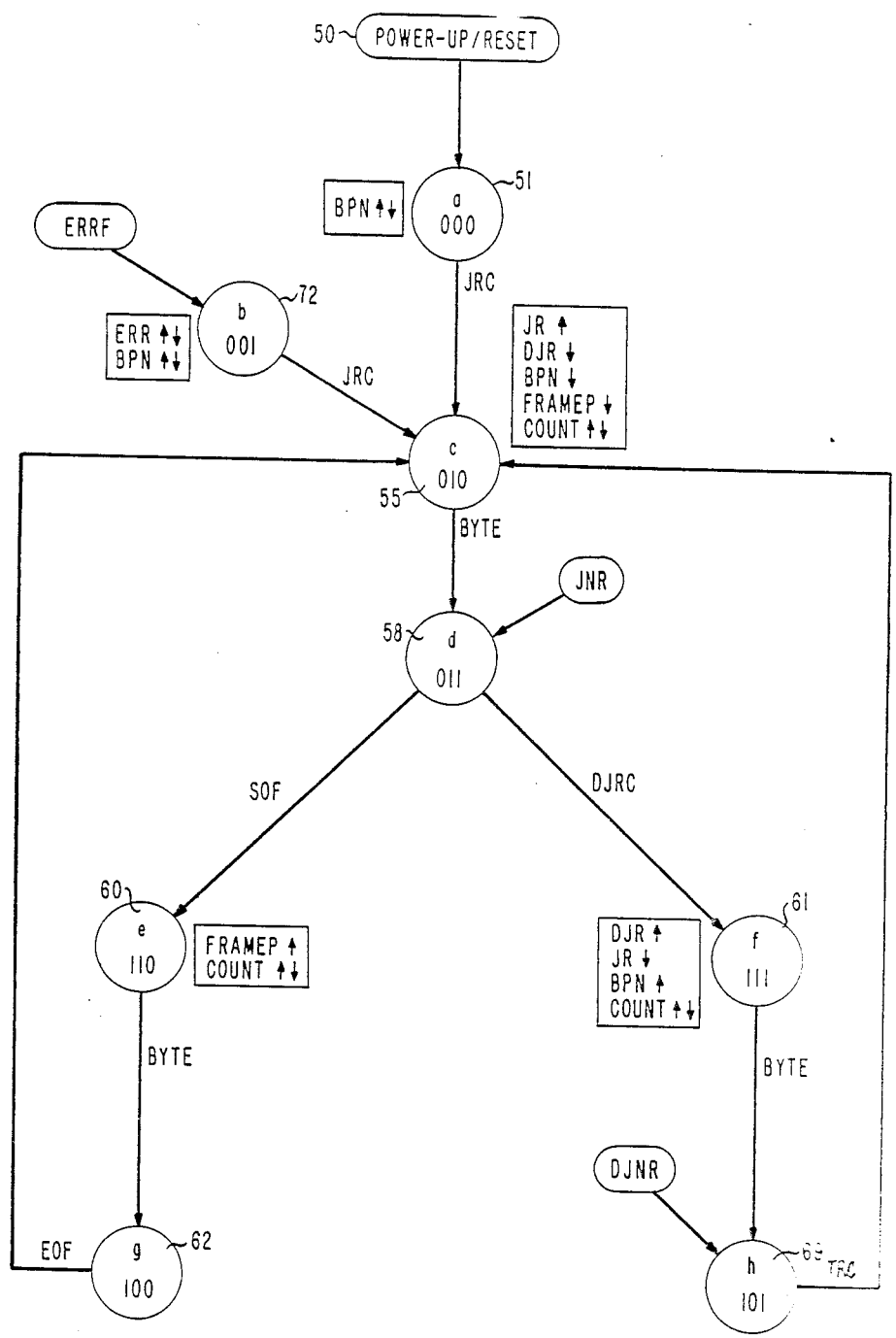

FIG. 4 recapitulates the operation described in connection with FIG. 3 in terms of the mnemonic documented states. The eight possible controller states are designated a, b, c, d, e, f, g and h in FIG. 4 corresponding to boxes 51, 72, 55, 58, 60, 61, 62 and 69 respectively. Each state in FIG. 4 is accompanied by a binary notation 000, 001, 010, 011, 110, 111, 100 and 101 respectively. The binary notation relates to signals from central timer 20 as will become clear from the discussion below.

Central timer 20 communicates with each (assumed to be eight) $DCL_i$ in order to maintain the integrity of the network by monitoring the TOKEN that is circulating in the ring. It maintains a counter to check that node switches are passing the TOKEN within the specified time. A last TOKEN or a broken fiber is detected easily in this manner and timer 20 sends the requisite control signal to the DCL when it detects such a problem.

Figure 5:
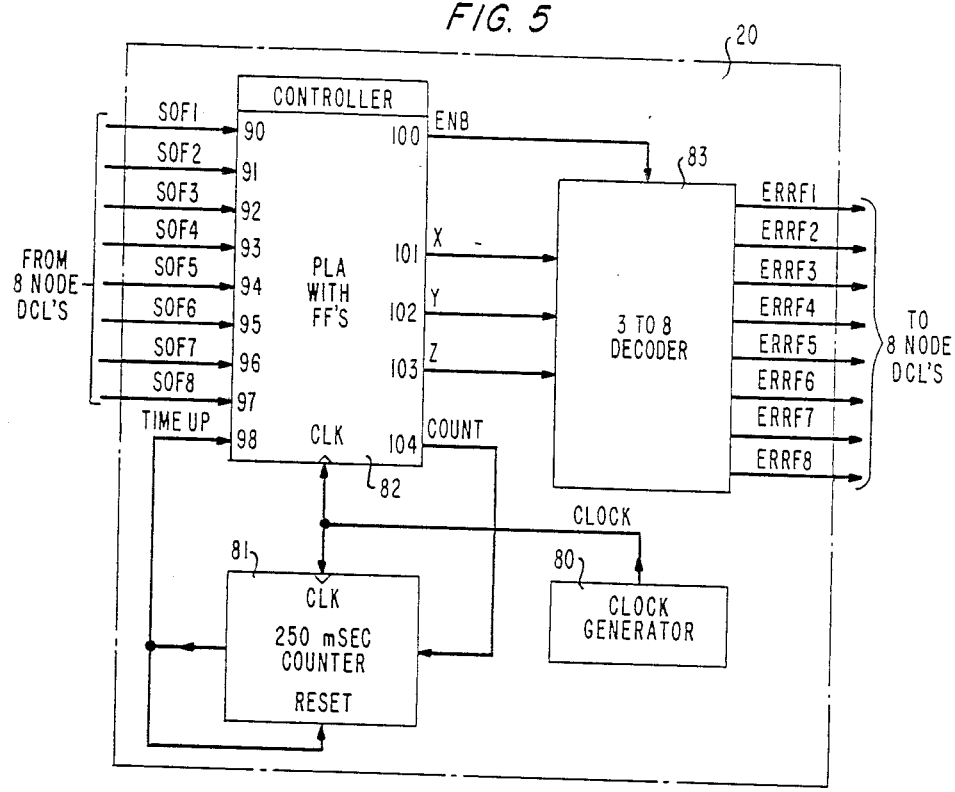
FIG. 5 is a block diagram of the central timing arrangement of the network of FIG. 1.

FIG. 5 shows a block diagram of central timer 20. The timer comprises four functional blocks. These blocks are a clock generator 80, a counter 81, a controller 82, and a decoder 83.

Controller 82 comprises a PLA (with flip-flops not shown) operative in response to input signals on nine inputs 90, 91, 92, - - - , 98 to provide a state condition on five outputs 100, 101, 102, 103 and 104. The inputs are from an assumed eight node DCL's. Outputs 101, 102 and 103 are connected to inputs to decoder 83. Decoder 83 is a three to eight decoder operative to provide an error signal $ERRFk$ to the assumed eight node DCL's. Output 100 is connected to a fourth input to decoder 83 for applying an enabling signal ENB.

Output 104 is connected to an input of counter 81. The output of clock generator 80 is connected to a clock input of controller 82 and counter 81. The output of counter 81 is connected to input 98 of controller 82 and to its own reset input.

Clock generator 80 supplies a one megabit clock pulse to counter 81 and controller 82. Clock generator 80 also supplies the one megabit clock pulse for the DCL's of FIG. 1. Counter 81 is operative to generate a "TIME-UP" signal when 250 milliseconds have passed after the counter is reset or initialized. The controller 82 initializes counter 81 whenever it detects (from a $DCL_i$) that a node has transmitted a healthy TOKEN (free or busy). The counter is reset by the controller also when some other node ($DCL_i$) transmits the TOKEN before the 250 millisecond time period elapses. Thus, if all nodes joined in the ring promptly pass the healthy TOKEN, the 250 millisecond time period never elapses and the TIME-UP signal never occurs. The 250 millisecond time period is of arbitrary duration which can be changed in a straightforward manner by changing the configuration of counter 81.

The controller's main function is to coordinate all the signals in timer 20. Each $DCL_i$ sends an SOF (start of frame) signal to controller 82 to indicate that the corresponding node is transmitting the TOKEN. This is valid because the free TOKEN in the TOKEN-ring network starts with the SOF delimiter and ends with an EOF (end of frame) delimiter. The busy TOKEN (included in the data frame) also starts with an SOF delimiter but the information and some other data fields are included between the busy token and the EOF delimiter.

Figure 6:
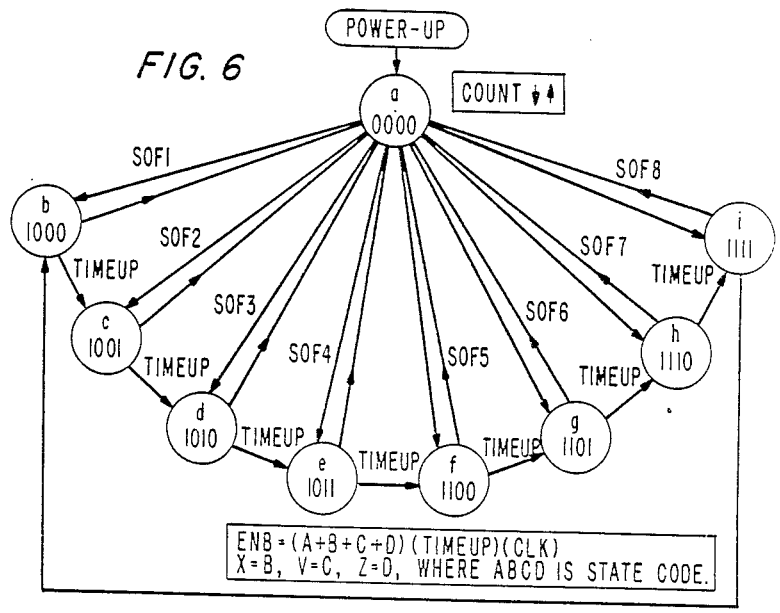
FIG. 6 is a schematic representation of the state diagram of the timing arrangement of FIG. 5.

FIG. 6 shows the state diagram of all the state transitions for controller 82 of FIG. 5. On power-up, controller 82 enters state "a" and stays in that state awaiting an input SOF signal from any one of the eight DCL's. When an SOF signal occurs, the controller enters a different state ("b" through "i") the assignment code (four bits) indicates the originating $DCL_i$. The controller activates the counter whenever it enters any one of the eight states. Prior to the expiration of the 250 m/sec time-up period, another of the $DCL_i$'s sends another SOF signal or a TIME-UP signal is generated. If a TIME-UP signal occurs, the controller moves into the next state to the right as viewed in FIG. 6. The controller moves from "b" to "c", from "c" to "d", and so on in response to corresponding TIME-UP signals and activates the END (enable) output of FIG. 5 on each occurrence, activating the corresponding ERRF (ERROR flag) at the decoder output.

If another SOF signal occurs prior to a TIME-UP signal, the controller moves to the corresponding state through state "a" where it resets and starts counter 81 of FIG. 5 over again. Thus, when all nodes are joined in the network and functioning properly, controller 82 continuously passes through all the states going through state "a" every time it enters a new state. Controller 82 resets counter 81 each time it enters state "a" and restarts counter 81 each time it leaves state "a".

Decoder 83 of FIG. 5 decodes outputs 101, 102 and 103 of controller 82 into one of eight error signals ERRF. When enable signal ENB, on controller output 100, is not active, none of the decoder outputs will be active. When enable signal ENB is active, one of the outputs of decoder 83 will go active according to Table II as follows:

TABLE II

| Input (XYZ) | Active Output |
| --- | --- |
| 000 | ERRF1 |
| 001 | ERRF2 |
| 010 | ERRF3 |
| 011 | ERRF4 |
| 100 | ERRF5 |
| 101 | ERRF6 |
| 110 | ERRF7 |
| 111 | ERRF8 |

Since the (XYZ) inputs represent the states of controller 82 of FIG. 6 directly, when a TIME-UP signal occurs, decoder 83 activates only the corresponding ERRF signal. That signal is applied directly to the DCL that is next in the ring that did not receive the next expected SOF signal within the prescribed time up period. Thus, the node which did not send the next expected SOF signal prior to the expiration of the exact time up period is bypassed.

As an example of this operation, assume that DCL1 has sent SOF1 signal to timer 20 and controller 82 enters state "b" of FIG. 6 starting counter 81. This means that the node connected to DCL1 has transmitted a TOKEN (free or busy). Now assume that the TOKEN is lost at the node which is connected to DCL2 (viz: a broken fiber). Consequently, DCL2 does not receive an SOF2 signal from that node and the time up period elapses leading to a TIME-UP signal. At this juncture in the operation, controller 82 enters state "c" directly from "b" and an ENB signal occurs to enable decoder 83. In this state, code 001 occurs and the ERRF2 output of decoder 83 goes active. The ERRF2 signal is applied to DCL2 to bypass the node connected to it immediately.

Figure 7:
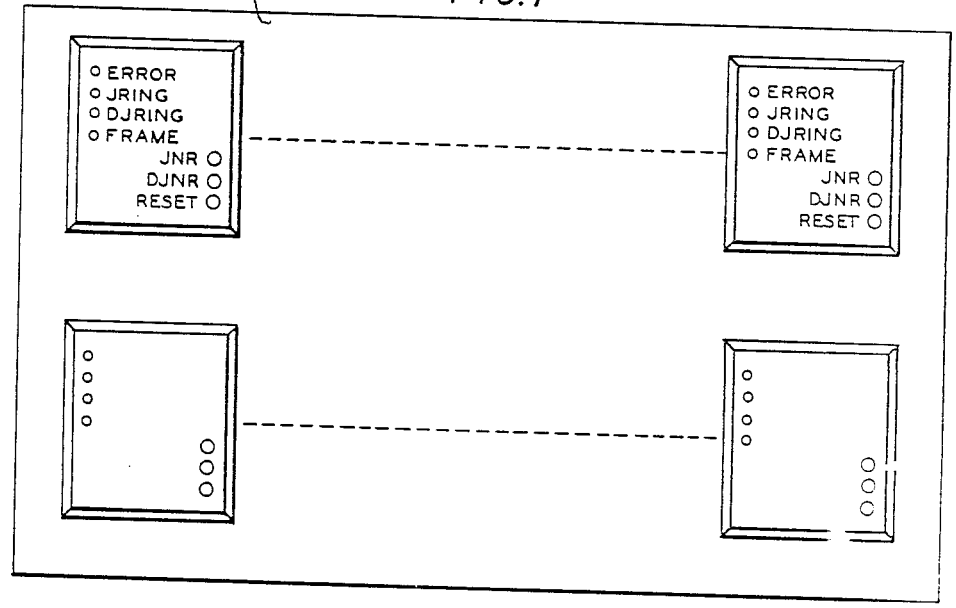
FIG. 7 is a plan view of the front panel of a ring wiring center showing the controls and display arrangement for eight digital control logic portions of the network of FIG. 1.

FIG. 7 shows a plan view of a ring wiring center from panel 110. The panel includes eight displays for the assumed eight DCL's discussed. Table III indicates the designation and interpretation of three button controls and four LED indicators. Table IV indicates the possible LED illumination codes and the corresponding interpretations:

TABLE III

FRONT PANEL CONTROLS/INDICATORS

PUSHBUTTON CONTROLS

| | |
|---|---|
| 1. JNR: | Join The Node In The Ring |
| 2. DJNR: | Disjoin The Node From The Ring |
| 3. RESET: | RESET The DCL |

LED INDICATORS

| | |
|---|---|
| 1. ERROR: | Lost TOKEN/Broken Cable Error Detected |
| 2. JRING: | Node Joined The Ring |
| 3. DJRING: | Node Disjoined The Ring |
| 4. FRAME: | Free TOKEN or Full FRAME Is Passing By |

TABLE IV

0 = LED is OFF; 1 = LED is ON

| ERROR | JRING | DJRING | FRAME | INTERPRETATION |
|---|---|---|---|---|
| 0 | 0 | 0 | 0 | POWER UP/RESET condition and the node is in the Bypass mode. |
| 0 | 1 | 0 | 0 | Node joined the ring by issuing JOIN RING command but not transmitting anything now. |
| 0 | 1 | 0 | 1 | Node is transmitting a FRAME or Free TOKEN. |
| 0 | 0 | 1 | 0 | The node has issued the DISJOIN RING command and is being bypassed. |
| 1 | 0 | 0 | 0 | Some ERROR is detected on the node side and so the node is disconnected from the ring. |

The network can be implemented either with fiber optic switches and erasers or by an integrated optic circuit. In the fromer, closely spaced optical fibers switches may be operated by physically moving adjacent fibers from spaced apart positions at which only negligible coupling occurs to more closely spaced positions at which significant coupling occurs, as described below. The eraser employs an optical fiber and a closely spaced optical absorber operative similarly, as described below. In the fiber optic embodiments, an actuator is operative to apply pressure to cause the physical movement.

No physical movement occurs if integrated optic implementations are used. Instead, a region of solid material separates two waveguides in a switch, or a waveguide and an optical absorber in an eraser. The actuator, in these cases, is operative to change the optical properties of the region from, for example, those of a cladding to those of a waveguide, thus permitting significant coupling to occur. Suitable components are disclosed in the above-identified, copending patent applications and discussed in the following paragraphs.

Figure 8:
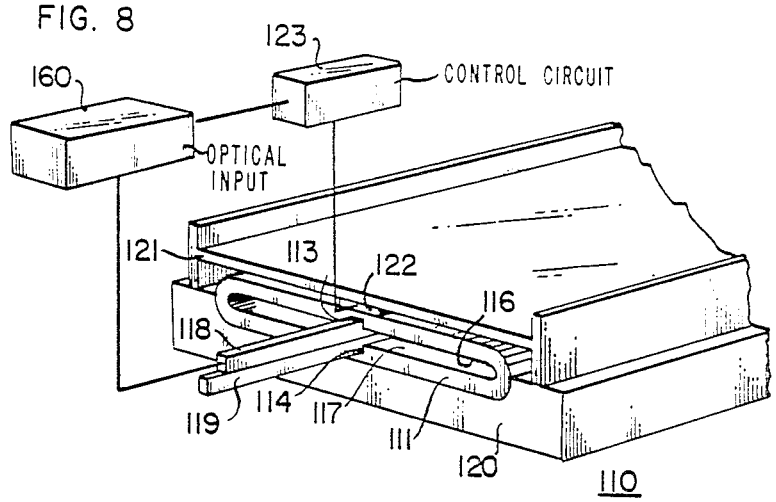
FIG. 8 is a perspective view of a switch that may be used with this invention.

FIG. 8 shows a switch 110 which comprises a hollow glass sleeve structure 111 having facing slots 113 and 114 made in the opposing internal faces 116 and 117, respectively, as shown. Optical fibers 118 and 119 are set into slots 113 and 114 in a manner to be discussed more fully hereinafter. The switch also comprises a rigid support 120 including bridge member 121 from which element 122 is supported. Element 122 is a pressure transducer or actuator adjusted to apply pressure to sleeve 111 in a manner to force fibers 118 and 119 towards one another. In one illustrative embodiment, element 122 comprises a piezoelectric or solenoid-based element responsive to a voltage applied to it to change its geometry in a well understood manner. Block 123 represents a control circuit operative to apply such a voltage to element 122. Alternatively, a manually controlled mechanical switch may be used.

The application of pressure by element 122 against sleeve 11 determines the amount of optical energy coupled from one fiber to another in any representative switch. If, for example, fiber 118 is taken as an input fiber, optical energy is coupled from fiber 118 to fiber 119 by applying such pressure in a manner to reduce the distance between fibers 118 and 119 from a first distance at which only negligible coupling occurs to a second distance at which significant coupling occurs.

Figure 9:
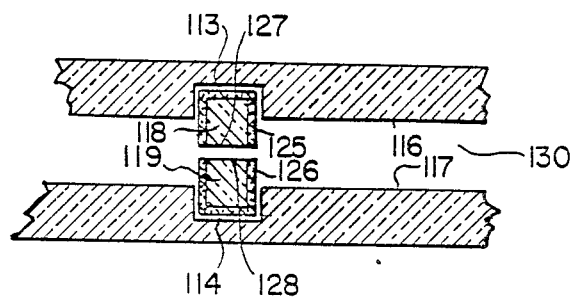
FIG. 9 is an enlarged schematic cross-sectional view of a portion of the switch of FIG. 8.
Figure 10:
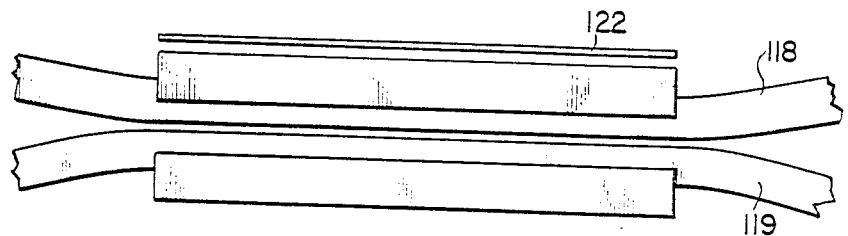
FIG. 10 is a schematic side view of a portion of the switch of FIG. 8.
Figure 11:
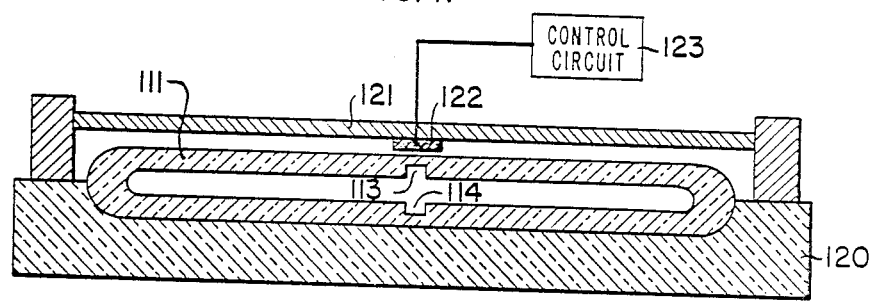
FIG. 11 is a cross-sectional view of the switch of FIG. 8.

FIG. 9 shows an enlarged cross sectional view of a portion of the sleeve with slots 113 and 114 in which fibers 118 and 119 are positioned. The fibers are shown illustratively as having sqaure cross-sections and claddings 125 and 126 on all but the facing surfaces 127 and 128. The claddings are of sufficient thickness to meet the internal reflection requirements of the cladding except where the thickness is reduced or where the cladding is removed. The internal space 130 of the sleeve is filled with liquid having an index of refraction which is essentially the same as that of claddings 125 and 126. That is to say, the index of refraction of the liquid is such as to cause optical energy to be reflected back into fiber 118 when fibers 118 and 119 are spaced apart normally in the absence of pressure applied by element 122. When pressure is applied, the spacing between the fibers is reduced, and optical energy is coupled into fiber 119 in a manner such that only negligible information is lost. That pressure is applied to the sleeve, as indicated in the side view of FIG. 10 and the end view of FIG. 11, in a position in alignment with slots 113 and 114. Bridge member 121 is of sufficient structural strength to remain rigid for the pressures applied.

Figure 12:
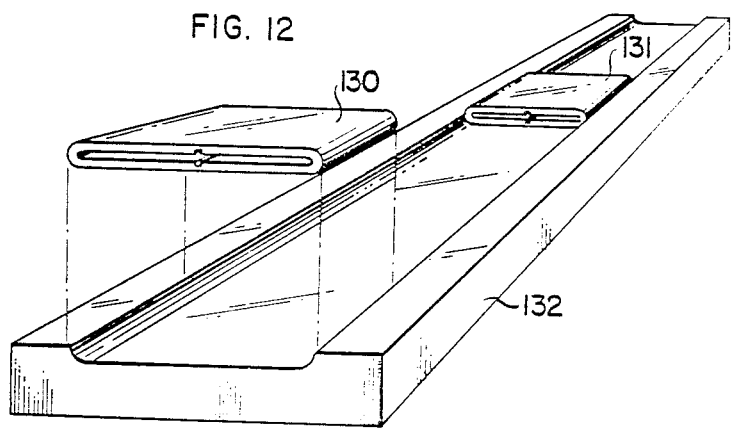
FIG. 12 is a perspective view, partially exploded, of a portion of a switch arrangement, employing the switch of FIG. 8.

A number of switches can share a common support as will be the case frequently in practice. FIG. 12 shows two switches 130 and 131 mating with a common support 132. Switch 130 is shown exploded from the base in FIG. 12. FIG. 13 shows a switch in place in support 132 with input fiber 134 and tap or shunt fiber 135 properly positioned. It is to be understood that a number of switches can share a common support, each with its own pressure generating apparatus which would permit information to be tapped off an input fiber controllably so that optical systems can be implemented using a simple arrangement of such switches.

Another similar optical device is represented in FIG. 14 which shows a cross-section of a portion of a sleeve structure 140 like 111 of FIG. 8. An input fiber 141 is placed in a slot (not shown) similar to slot 113 of FIG. 9. There is no tap fiber in this instance. Instead, a relatively large block of glass 142 is placed in alignment with fiber 141 separated by a liquid. Again, the cladding on fiber 141 is absent (illustratively) along the side facing block 142. Again, when a voltage is applied to abutting piezoelectric element 143, the spacing between fiber 141 and block 142 is reduced. Block 142 has properties for absorbing optical energy and is adapted to absorb a large fraction of energy when the block abuts fiber 141. Such an optical energy eraser also can share a common support with other switches, and this device also can be used to implement systems in a simple manner.

The optical fibers are shown in the various figures to have a square cross-section with cladding removed from the opposing faces of the fibers. This arrangement is illustrated specifically in FIG. 9 as described hereinbefore. The fibers may have other cross-sections as well. FIG. 15, for example, shows fibers 150 and 151 which may be used to make an optical switch or eraser as described herein. In this instance also, the claddings 152 and 153 also may be absent from the opposing faces of the fibers.

The choice of fiber cross-section, cladding thickness, fiber spacings and indices of refraction are selected to permit controllable reduction of optical energy in a first fiber and the erasure of or transfer of information corresponding to that energy controllably to another fiber. In a sense, these choices enable the use of what was considered in the prior art to be a mechanism leading to undesirable cross talk as a controllable mechanism for the transfer of information from one optical fiber to another.

The factors which affect optical coupling between two optical fibers (waveguides) can be determined analytically from a consideration of the optical energy which couples back and forth between two waveguides placed adjacent to one another. The amount of coupling depends on a variety of factors, most notably the thickness of the cladding material between two cores, and the relative cross-sections of the two cores. Commercially available fibers are designed to keep this coupling (cross talk) to a minimum by having very thick cladding. In accordance with the principles of the present invention, it is desirable to induce a large amount of coupling, and so the thinner the cladding (at the optical switch), the better. The rest of the fiber surfaces should have a thick cladding around them to reduce unnecessary loss of optical energy. It is contemplated herein to have the cladding at least relatively thin or absent from opposing faces of fibers within the confines of the switch.

The following considerations are based on customary assumptions that the waveguide is perfect, without any type of disturbance (no core-cladding interface imperfections, no bends, etc.) and, thus, there is an equal distribution of power amongst the different modes in the short lengths of fibers under consideration. These assumptions imply that the optical energy source (160 of FIG. 8) excites every mode and that the actual source profile, in itself, is uniform. These assumptions also imply that the numerical aperture of the source (the solid angle of radiation) is at least equal to or greater than the numerical aperture of the fiber (118 of FIG. 8).

In a multimode fiber, the guided modes can be regarded as rays traveling inside the core of the fiber and experiencing total internal reflection at the core-cladding interface. The modes that travel in the core have certain phase constraints imposed on them. That is to say, every time a ray hits a core-cladding interface, it experiences a phase shift which is a multiple of 2 pi as is well understood in the art. This phase shift is due to the penetration of the cladding by the ray. The maximum depth of penetration, dP, necessary to achieve such a phase change is determined by the minimum angle of incidence for a mode for which dP is a real number. To achieve transverse light coupling among two fibers, the maximum thickness of cladding allowed between the two abutting surfaces of fibers is equal to the penetration depth determined for a mode at an angle less than the minimum incidence angle for which dP approximately equals infinity. The angle of incidence is defined as the angle between the direction of the light beam and a line perpendicular to the interface between the core and the cladding of a fiber.

The length (of coupled fiber) over which coupling is required for complete transfer of mode energy of a particular mode from one fiber to another is affected by the mode angle of incidence, the core size, and the separation between fibers as is well understood in the art. Coupling over a length of up to 0.5" has been found satisfactory for all modes of interest herein and accordingly, a switch as described herein typically has a length of 0.5". Of course, greater lengths can be used but contribute nothing to performance. The typical switch also has a width of 0.4" and a thickness of 0.048". The eraser similarly has dimensions of 0.5"×0.02"×0.02" with block 140 of FIG. 14 having dimensions of 0.5"×0.4"×0.016".

There is an optimum coupling length ($L_{opt}$) for which maximum coupling power is obtained for more than one mode. The percentage of coupling is a function of core size, the cladding thickness, and the length of the area of coupling. Generally, the longer the area of coupling the greater the coupling. Also, the thinner the cladding, the greater the coupling. For coupled fibers of equal core size, one-third inch is sufficient.

The support 120 of FIG. 8 is made of glass, ceramic, Kovar, etc.—any material which is rigid and has thermal expansion characteristics of glass. The tube 111 of FIG. 8 also is made of glass or quartz, one-eighth inch thick and having an index of refraction essentially equal to that of the fiber cladding or less. If no cladding is present on the cores within the sleeve, the sleeve itself conveniently has an index of refraction to serve the requirements of the claddings.

The switch is made from a relatively large diameter quartz sleeve which is machined to provide internal facing slots by drawing a die through the sleeve. The sleeve is placed in a drawing tower as a preform. The preform is heated to a temperature from which the sleeve is reduced in diameter to the desired size. A bead of curable resin is added to the slots and fibers are threaded into the slots. The resin has an index of refraction about equal to that of the cladding and may comprise, for example, an ultraviolet curable or heat curable epoxy.

It is important that the fibers be seated properly within the slots. Accordingly, an alignment block is employed to install the first fiber in one slot. The alignment block is a block of Boro silicate material drawn through the sleeve as pressure is applied to the outside of the sleeve. The pressure and the block squeeze the fiber into its slot. A typical alignment block has dimensions of 80 microns by 3 millimeters by 2 cms and a typical force on the structure is 8 to 16 ounces applied by a solenoid or actuator to the external surface of the sleeve. The second fiber is seated using the first fiber as an alignment block.

An alternative technique for making the switch is to start with a quartz sleeve of small diameter equal to that of the required sleeve size. A metal rod having a cross-section exactly equal to that of the sleeve is placed within the sleeve. The sleeve is heated until molten. The air is then sucked out of the sleeve until the sleeve collapses onto the rod. The rod is pulled free while the sleeve is still warm. A conventional mold relief material is used to prevent the rod from sticking. The epoxy and fibers are installed as above.

In the sleeve, the claddings on the opposing faces of the fibers are typically reduced to at least about five microns on a one hundred micron core fiber. The fibers typically are spaced forty microns apart, cladding to cladding. The piezoelectric element 122 of FIG. 8 applies a continuous force of eight to sixteen ounces to flex the sleeve in response to a continuously applied five hundred volts.

It is possible to eliminate the liquid between the fibers in the sleeve. But, in instances where no liquid is used, two additional cladding-to-air interfaces have to be considered. Consequently, additional constraints are imposed and losses incurred. The preferred mode employs a liquid and at least a thin cladding on each fiber where the index of refraction of the liquid matches that of the cladding. The term "fluid" is used herein to encompass both liquid and gaseous materials for use within the switch to implement a variable-thickness cladding.

The sleeve switch has been described in terms of optical fibers in a switch in which the separation between fibers is controllably changed. But such a switch may be implemented with integrated optic techniques as well. Of course, in an integrated optic circuit, waveguides are not amenable to physical movement readily. In integrated optic circuits, the waveguides are formed by photolithographic techniques to be spaced apart a first distance at which only insignificant coupling occurs and the intermediate (solid) material has an index of refraction to act as a cladding for the waveguides. A voltage is applied along the longitudinal axis of the device to controllably change the index of refraction of the intermediate material to that of the waveguide. In this manner, the two waveguides, in effect, become one.

Integrated optic circuits suitable for such an implementation are made of Gallium Arsenide (GaAs) and Lithium Niobate (LiNbO$_3$). Such materials are useful only for a single mode. Integrated optic circuits of Silicon (Si) are expected to be available commercially in the near future and such a material permits multimode operation realized by the fiber optic embodiment disclosed above. Each waveguide has a width and thickness of about four to five microns. The two waveguides are separated by about less than five microns. Each waveguide (GaAs) has an index of refraction of 3.4 (at 1.3 microns wavelength) and the intermediate material has an index of refraction of typically 1% less. A length dependent voltage of typically five volts applied along an axis parallel to that of the waveguides is operative to change the index of refraction of the intermediate material to that of the core. FIG. 16 shows an enlarged top view of waveguides 160 and 161 in an integrated optical circuit. The intermediate material is designated 162. A voltage is applied longitudinally across material 162 via voltage source 163 under the control of control circuit 165.

Operation of the circuit of FIG. 16 is analogous to that of the embodiment of FIGS. 8–11. But in this embodiment, no physical movement of the waveguides occurs. Rather, electronic means is operative, responsive to a command, to (essentially) eliminate the cladding in a manner to change the coupling between them. In the fiber optic embodiment, the cladding is eliminated by physically reducing the spacing between the fibers in a compliant medium of appropriate index of refraction to act as a cladding. In the integrated optic embodiment, a solid medium having an index of refraction also suitable to act as a cladding, is eliminated by changing the index of refraction to that of the waveguide.

An eraser is useful also in the integrated optic circuit embodiment. The controllable change of the index of refraction of the intermediate material does not operate to direct all information in waveguide 160 to waveguide 161. It may be desirable to extinguish unswitched information if no use is to be made of information routed along the originating waveguide. Accordingly, in FIG. 16, data originating at data input 170 can be utilized at data output 171 and data output 172.

In the embodiment of FIG. 17, on the other hand, data originating at data input 180 can be utilized only at data output 181. The embodiment of FIG. 17 includes not only the originating waveguide 190 and the shunt waveguide 192, corresponding to waveguides 160 and 161 of FIG. 16, but also includes an optical energy eraser. The eraser comprises a region 193 of material having an index of refraction to absorb optical energy from waveguide 190. Region 193 has typical dimensions of 20 microns×20 microns×20 microns and is separated by about four to five microns from waveguide 190 by intermediate material 194 (also separating waveguides 190 and 192). A voltage applied by the voltage source 195 is operative to eliminate the cladding effect of the intermediate material between the region 193 and waveguide 190 as well as between the two waveguides. Thus, only negligible optical energy is available at the output end of waveguide 190. Of course, the eraser may be adapted to be actuated separately.

FIG. 18 is a cross sectional view of an optical energy eraser 210 suitable for use in an optical network in accordance with one aspect of this invention. The eraser comprises a sleeve 211 having an internal surface 212. The vertical dimension of sleeve 211 as viewed in the figure, is relatively small to bring top and bottom portions of surface 212 into closely spaced apart positions. The top portion includes longitudinal slot 214 in which optical fiber 215 is secured. A relatively large volume quartz block 216 is fixed in position opposite fiber 215 as shown in the figure.

Fiber 215 is shown as having a relatively large core 217 (diameter=100 microns) and a cladding 218 (diameter=140 microns) shown absent in the area opposite block 216. The sleeve includes an open area 219 which, in the illustrative embodiment includes a liquid with an index of refraction equal or less than that of cladding 218. The sleeve is sealed at both ends in a manner to contain the liquid yet permit fiber 215 to extend beyond the sleeve.

The sleeve is supported by a rigid support member 225 to which rigid bridge 226 is also secured. Pressure element 227 is suspended from bridge 226 and is adapted to apply pressure to the sleeve in a manner to move fiber 215 and block 216 towards one another. Initially, fiber 215 is on the order of forty microns from block 216. When pressure element 227 applies pressure to the sleeve, fiber 215 is moved into contact with block 216.

Element 227 conveniently comprises a piezoelectric element operative to apply eight to sixteen ounces of force against sleeve 211 in response to a command signal. Control circuit 229 is operative to apply such a (steady state) voltage to element 227 to produce the force when required.

Eraser 210 is utilized conveniently with the switches described above. FIG. 19 shows such an arrangement in which the positions of an eraser 230 and first and second sleeve switches 231 and 232 share a common support member 234. Separate pressure elements (not shown in FIG. 19) are used as shown in FIG. 18. A common circuit operates the two switches and the eraser to form a node switch.

Figure 20:
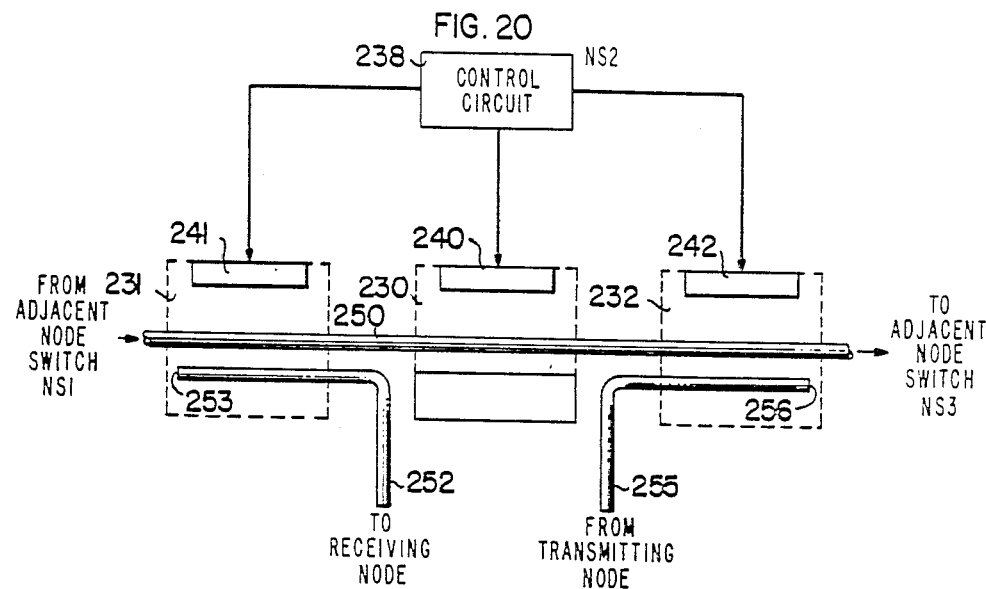
FIG. 20 is a schematic representation of the node switch of FIG. 19.

FIG. 20 shows a schematic representation of the node switch of FIG. 19 showing the various components of the node switch with a common control circuit 238. The node switch as shown in FIG. 20 comprises eraser 230 and switches 231 and 232 of FIG. 19 which pressure transducers 240, 241 and 242 of eraser 230 and switches 231 and 232, respectively. The three components share a common optical fiber 250 also connected between adjacent node switches as indicated. Three adjacent node switches are designated NS1, NS2 and NS3 for convenience. Switch 231 of node switch NS2 includes an additional fiber 252. Fiber 252 is sealed within the sleeve of switch 231 at one end 253 as shown, but extends beyond the sleeve at the other end terminating at a receiving node. Similarly, switch 232 includes an additional fiber 255. Fiber 255 also terminates within the sleeve of switch 232 at end 256, originating from a transmitting node at the other end.

Figure 21:
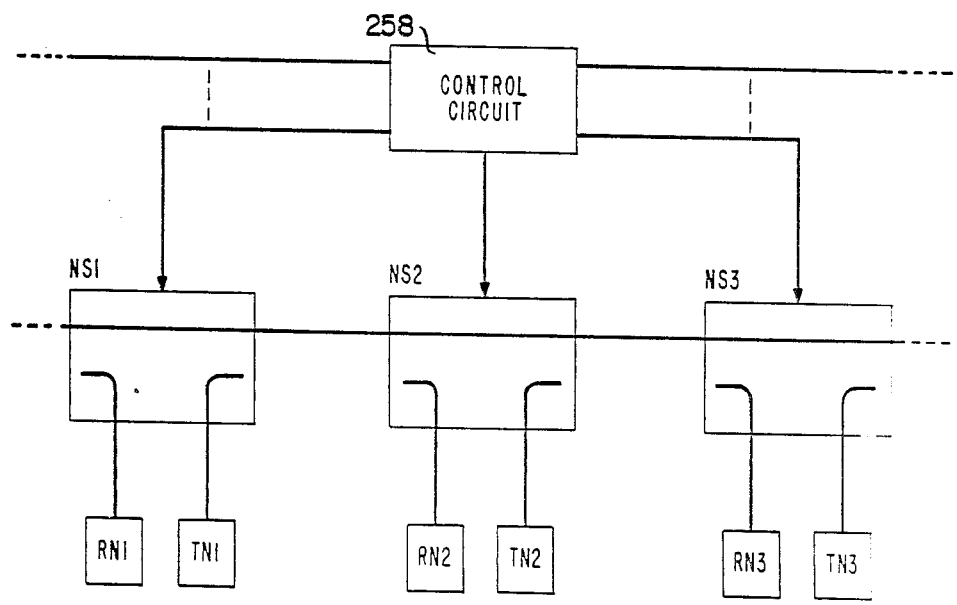
FIG. 21 is a schematic representation of a portion of a fiber optic network including node switches of the type shown in FIGS. 19 and 20.

FIG. 21 shows the overall organization of three node switches NS1, NS2, and NS3 with respective receiving and transmitting nodes and a control circuit 258. The receiving and transmitting nodes are designated RN1, RN2, and RN3 and TN1, TN2, and TN3 for node switches NS1, NS2, and NS3, respectively. The operation of a node switch of FIGS. 19 and 20 is now described in the context of the portion of a network described in connection with FIG. 21.

The network operates to route information carried by a light beam much as railroad cars are switched from track to track. Accordingly, if fiber 250 of FIG. 20 is visualized as a railroad track and if information in the fiber is visualized as a train, node switch NS2 of FIG. 20 operates to route a train on track 255 to track 250. If tracks 252 and 255 are visualized as leading to a railhead and originating at a railhead, respectively, the operation is operative to take a train out of service and to substitute a new train.

The control signals to control such an operation would be operative to close switch 241 and switch 242 and to deactivate the train on track 252 and activate the train on track 255. Of course this is just an analogy and information carried by an energy beam is not divided into a physical package such as a train. Thus, each node switch requires an optical energy absorber to extinguish any optical energy (viz: any train) not switched. Accordingly, a node switch utilizes steady state voltages applied to piezoelectric transducers to physically move adjacent fibers into close proximity in switches 231 and 232, and to move a fiber and absorber closer together in eraser 230. The voltage signals operate to isolate nodes NS1 and NS3 from one another and to connect RN2 and TN2 of FIG. 21 to nodes NS1 and NS3, respectively.

The eraser and node switch of FIGS. 18-20 have been described in terms of an optical fiber embodiment. But they may be implemented with an integrated optic circuit as well. In an integrated optic implementation, no physical components actually move. Instead, a waveguide and an absorber are separated by a region of the circuit which is capable of having its optical properties changed controllably, as discussed above in connection with FIGS. 16-17.

Although particular illustrative embodiments of the present invention have been described herein with reference to the accompanying drawings, the present invention is not limited to these particular embodiments. Various changes and modifications may be made thereto by those skilled in the art without departing from the spirit or scope of the invention, which is defined by the appended claims.

What is claimed is:

1. An optical network, said network comprising a plurality of node switches coupled to a first waveguide at a plurality of bypass portions of said first waveguide, each of said node switches including a second and a third waveguide and transducer means operative to controllably coupled said second and third waveguides to said first waveguide at an associated bypass portion therealong, said network also including control means responsive to input signals for applying command signals to said transducer means in a manner to selectively couple the associated second and third waveguides to said first waveguide along the associated bypass portion thereof, wherein each said transducer means is connected to said control means, wherein said waveguides comprise optical fibers, wherein said network includes a pair of receiving and transmitting nodes adapted for receiving from and transmitting information into said second and third optical fibers, respectively, of an associated one of said node switches, each said node switch being constructed to connect the associated pair of receiving and transmitting nodes to said first fiber through said associated ones of said second and third fibers, respectively, when said associated ones of said second and third fibers are coupled to the associated bypass portion of said first fiber, wherein said control means includes a control logic circuit arrangement for each said node switch, each said control logic circuit arrangement applying said command signals to the associated node switch in response to said input signals, and wherein said control means further includes central timing means for selectively supplying control signals to said control logic circuit arrangements.

2. A network in accordance with claim 1 wherein each of said node switches includes first and second sleeve switches separated by an optical eraser, said sleeve switches and eraser being coupled to said first fiber.

3. A network in accordance with claim 2 wherein each of said first sleeve switches is coupled to a bypass portion of said first fiber and one of said second fibers fixed in spaced apart positions such that only negligible coupling occurs therebetween, the associated one of said control logic circuit arrangements being adapted to control movement said first and second fibers into relatively closely spaced positions wherein significant energy coupling occurs therebetween.

4. A network in accordance with claim 2 wherein each of said second sleeve switches is coupled to a bypass portion of said first fiber and one of said third fibers fixed in spaced apart positions such that only negligible coupling occurs therebetween, the associated one of said control logic circuit arrangements being adapted to control movement said first and third fibers into relatively closely spaced positions wherein significant energy coupling occurs therebetween.

5. A network in accordance with claim 2 wherein each of said optical erasers is coupled to a bypass portion of said first optical fiber and include an optical absorber disposed in spaced apart position such that only negligible coupling occurs therebetween the associated one of said control logic circuit arrangements being adapted to control movement said first fiber and said absorber into relatively closely spaced positions wherein significant energy coupling therebetween occurs.

6. A network in accordance with claim 2 wherein each of said second fibers originates in an associated one of said sleeve switches and is adapted to apply optical information to the associated one of said receiver nodes.

7. A network in accordance with claim 2 wherein each of said third fibers terminates in an associated one of said sleeve switches and is adapted to receive optical information from the associated one of said transmitting nodes.

8. A network in accordance with claim 1, wherein said control means includes means for detecting an error in the network, said error detecting means being connected to the control logic circuit arrangement for each node switch, said error detecting means producing an error-indicative signal in response to an error in the network.

9. A network in accordance with claim 1, wherein each control logic circuit arrangement includes means for detecting a predetermined optical signal in said first optical waveguide, each said detecting means being connected to said control means, each said detecting means transmitting a timing signal to said control means in response to the detection of said predetermined optical signal.

10. A network in accordance with claim 9, wherein said central timing means includes means for checking the time between successive timing signals.

11. A network in accordance with claim 10, wherein said central timing means further includes means for producing an error flag signal if the time between successive timing signals is greater than a preselected time.

* * * * *